US006695244B2

United States Patent
Burch

(10) Patent No.: US 6,695,244 B2
(45) Date of Patent: Feb. 24, 2004

(54) WINDING TOOL FOR FORMING WIRE COILS IN A STATOR STACK INCLUDING RADIALLY MOVABLE FORMING MEMBERS

(75) Inventor: Jerry C. Burch, Dayton, OH (US)

(73) Assignee: Globe Motors, Inc., Dayton, OH (US)

( * ) Notice: Subject to any disclaimer, the term of this patent is extended or adjusted under 35 U.S.C. 154(b) by 0 days.

(21) Appl. No.: 10/196,400

(22) Filed: Jul. 16, 2002

(65) Prior Publication Data

US 2003/0015620 A1 Jan. 23, 2003

Related U.S. Application Data

(60) Provisional application No. 60/306,134, filed on Jul. 17, 2001.

(51) Int. Cl.[7] .............................................. H02K 15/085
(52) U.S. Cl. ......................... 242/432.5; 29/596; 29/605
(58) Field of Search .......................... 242/432.3, 432.4, 242/432.5, 432.6; 29/596, 732, 736, 605

(56) References Cited

U.S. PATENT DOCUMENTS

| 2,998,937 | A | * | 9/1961 | Potter et al. ............. 242/432.3 |
| 3,334,825 | A | * | 8/1967 | Friedrich et al. ............ 242/432 |
| 3,753,282 | A | * | 8/1973 | Wiehl ........................... 29/736 |
| 3,841,133 | A | * | 10/1974 | Rice, Jr. ....................... 72/168 |
| 5,113,573 | A | * | 5/1992 | Taji et al. ...................... 29/596 |
| 5,316,227 | A | * | 5/1994 | Oohashi et al. ............ 140/92.2 |
| 5,732,900 | A | * | 3/1998 | Burch ..................... 242/432.5 |
| 5,860,615 | A | | 1/1999 | Burch |
| 6,206,319 | B1 | * | 3/2001 | Burch ..................... 242/432.4 |

* cited by examiner

Primary Examiner—Emmanuel Marcelo
(74) Attorney, Agent, or Firm—Stevens & Showalter LLP

(57) ABSTRACT

A winding tool for forming wire coils in a stator stack for a dynamoelectric machine including a base structure having a cylindrical wall and forming members for forming wire located in the stator stack during the winding operation. The winding tool includes wire apertures for feeding wire into the slots of a stator stack during a winding operation, and the forming members include forming blades for extending into the slots of the stator stack to push the wires positioned therein radially outwardly. In addition, end formers are provided at longitudinal ends of the forming blades for extending across the end faces of the stator stack to position the end turns of the wire coils radially outwardly. An actuator structure is provided for actuating the forming blades and end formers simultaneously at predetermined times throughout a winding operation to thereby form the wire coils radially outwardly and create greater slot fill densities.

14 Claims, 10 Drawing Sheets

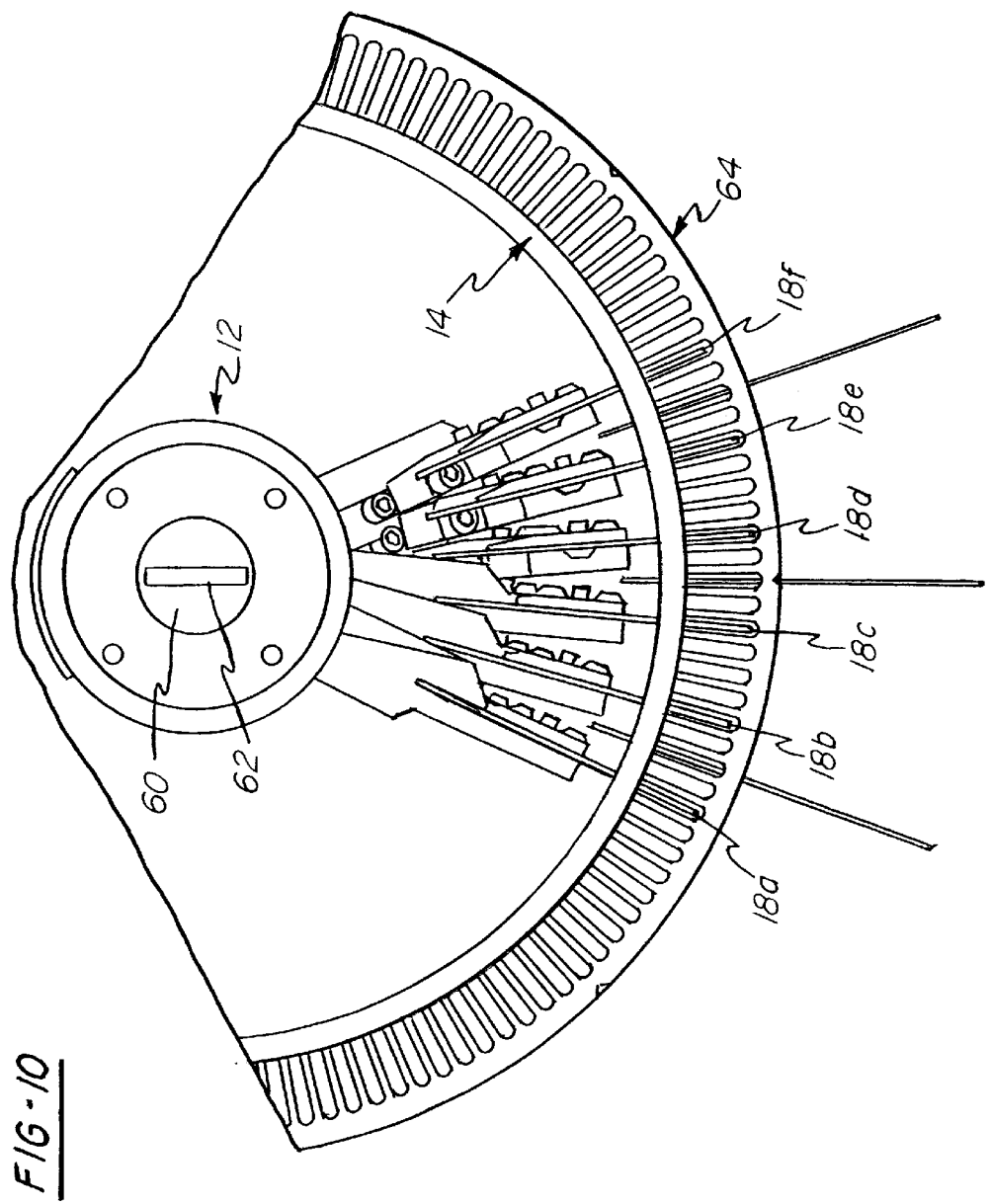

WINDING TOOL FOR FORMING WIRE COILS IN A STATOR STACK INCLUDING RADIALLY MOVABLE FORMING MEMBERS

BACKGROUND OF THE INVENTION

1. Field of the Invention

This invention relates generally to the manufacture of stator for dynamoelectric machine field windings. More particularly, the present invention relates to a winding tool for facilitating forming of wire coils in a stator stack for a dynamoelectric machine.

2. Description of the Prior Art

In many conventional dynamoelectric machines, the magnetic stator core comprises a stacked plurality of relatively thin laminations of magnetic material having a central bore which receives the rotor member of the machine. A plurality of slots extend radially inwardly from the bore for receiving the field coils of the machine, wherein such slots are defined by radially extending teeth. A predetermined number of turns of insulated wire conductor are arranged within such slots to form the excitation windings of the motor.

After the coils have been placed within the stator core, the return ends of the coils extend out of the stator slots and beyond the ends of the stator core. For reasons of appearance, as well as customer specifications, the coil ends need to be shaped into a particular desired configuration. Such shaping operations are conventionally referred to as forming or blocking operations. One apparatus for performing such a forming operation is disclosed in U.S. Pat. No. 5,860,615 in which a winding tool is providing with forming racks which may be actuated for extension radially from the sides of the forming tool to intermittently push the end turns of the coils radially outwardly.

It has been observed that during such forming of the end turns of the coils, the wire extending through the slots may tend to flex inwardly toward the center of the stator, and thus reduce the amount of area available for receiving further windings. Accordingly, there has been an observed need for an apparatus to provide the continued advantages associated with providing a tool for forming the end turns of wire coils, while also providing a forming operation for wire located within the slots of the stator.

SUMMARY OF THE INVENTION

The present invention resides in a winding tool for forming winding coils in a stator stack for a dynamoelectric machine which satisfies the foregoing needs. The tool comprises, generally, an elongated base structure defining a longitudinal axis, at least one elongated forming blade supported on the base structure and supported for movement, relative to the base structure, in a direction transverse to the longitudinal axis. The at least one forming blade includes an outer edge defining an edge of elongation lying in a plane substantially parallel to the longitudinal axis and an actuator structure is provided, extending through the base structure, for actuating the forming blade in movement whereby the outer edge of the blade is moved from a retracted position to an extended position for insertion through a slot in a stator stack during a winding operation forming wire coils on the stator stack.

In a further aspect of the invention, a plurality of forming blades are provided wherein the actuator structure simultaneously actuates the plurality of forming blades for movement in a radial direction to extend through a plurality of slots in a stator stack. Further, the base structure preferably defines a cylindrical wall, and the outer edges of the forming blades are positioned flush with the cylindrical wall when in the retracted position.

In yet another aspect of the invention, the winding tool includes a wire aperture defined in the outer surface of the base structure for receiving wire guided through the base structure and guiding the wire outwardly from the base structure to form wire coils on a stator stack.

In an additional aspect of the invention, end formers are located adjacent longitudinal ends of the forming blades, and extend transversely of the forming blades and are actuated radially outwardly for engaging end turns of wire coils on the stator stacks. The outer surfaces of the end formers are contoured to be flush with the outer surface of the base structure when the end formers are in a retracted position. Further, the end formers and former blades are simultaneously actuated by the actuator structure and, in the preferred embodiment, the end formers and forming blades are each supported on a rack including a rack of gear teeth which mesh with a shaft forming a pinion gear extending through the base structure such that rotation of the shaft causes radial actuation of the end formers and forming blades.

Other aspects of the invention will be apparent from the following description, the accompanying drawings and the appended claims.

BRIEF DESCRIPTION OF THE DRAWINGS

FIG. 10 is a top plan view of the winding tool with the upper end former removed and illustrating extension of the forming blades into a stator stack.

DETAILED DESCRIPTION OF THE PREFERRED EMBODIMENT

Figure 1:
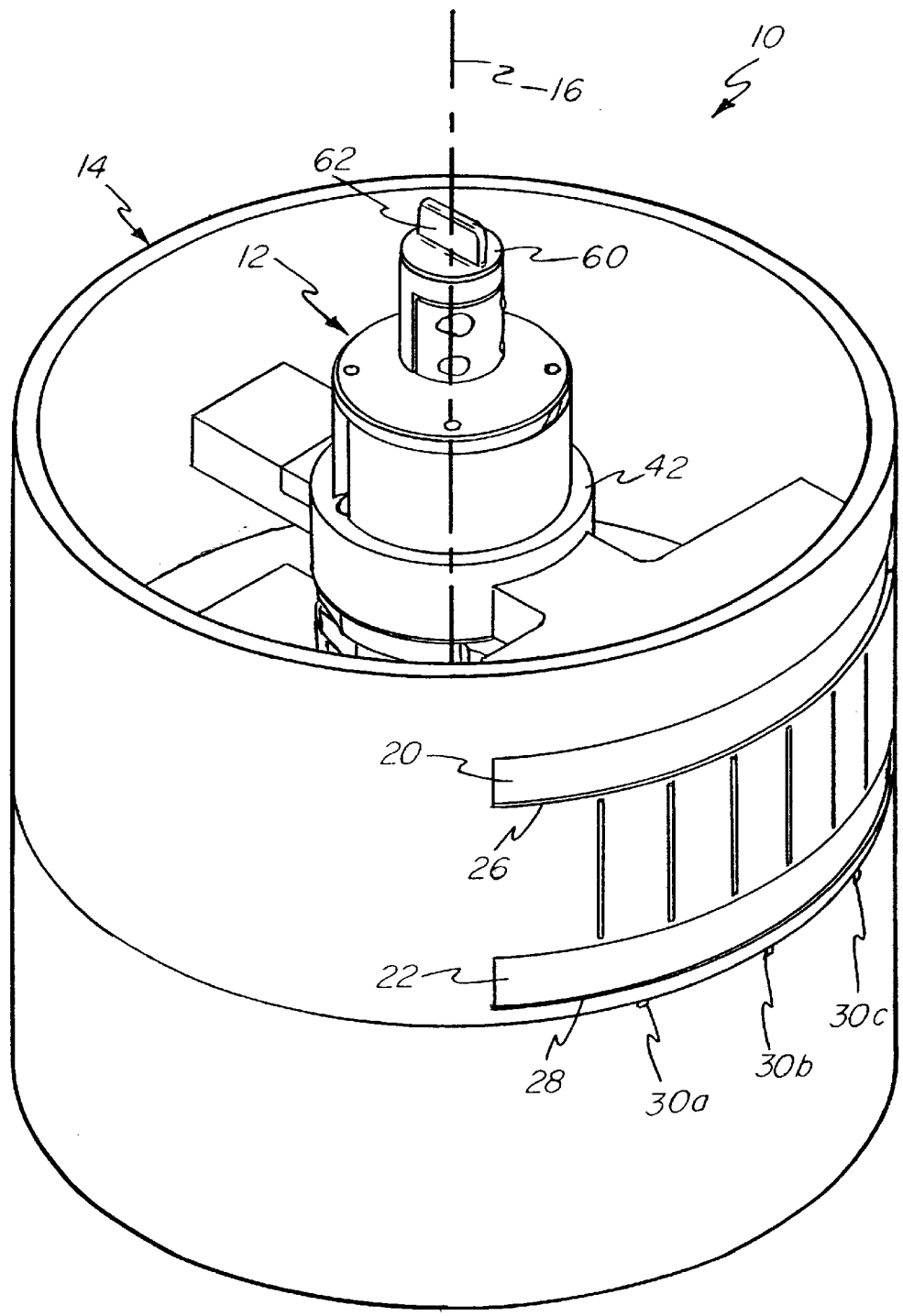
FIG. 1 is a perspective view of the winding tool of the present invention with the forming members in a retracted position.
Figure 2:
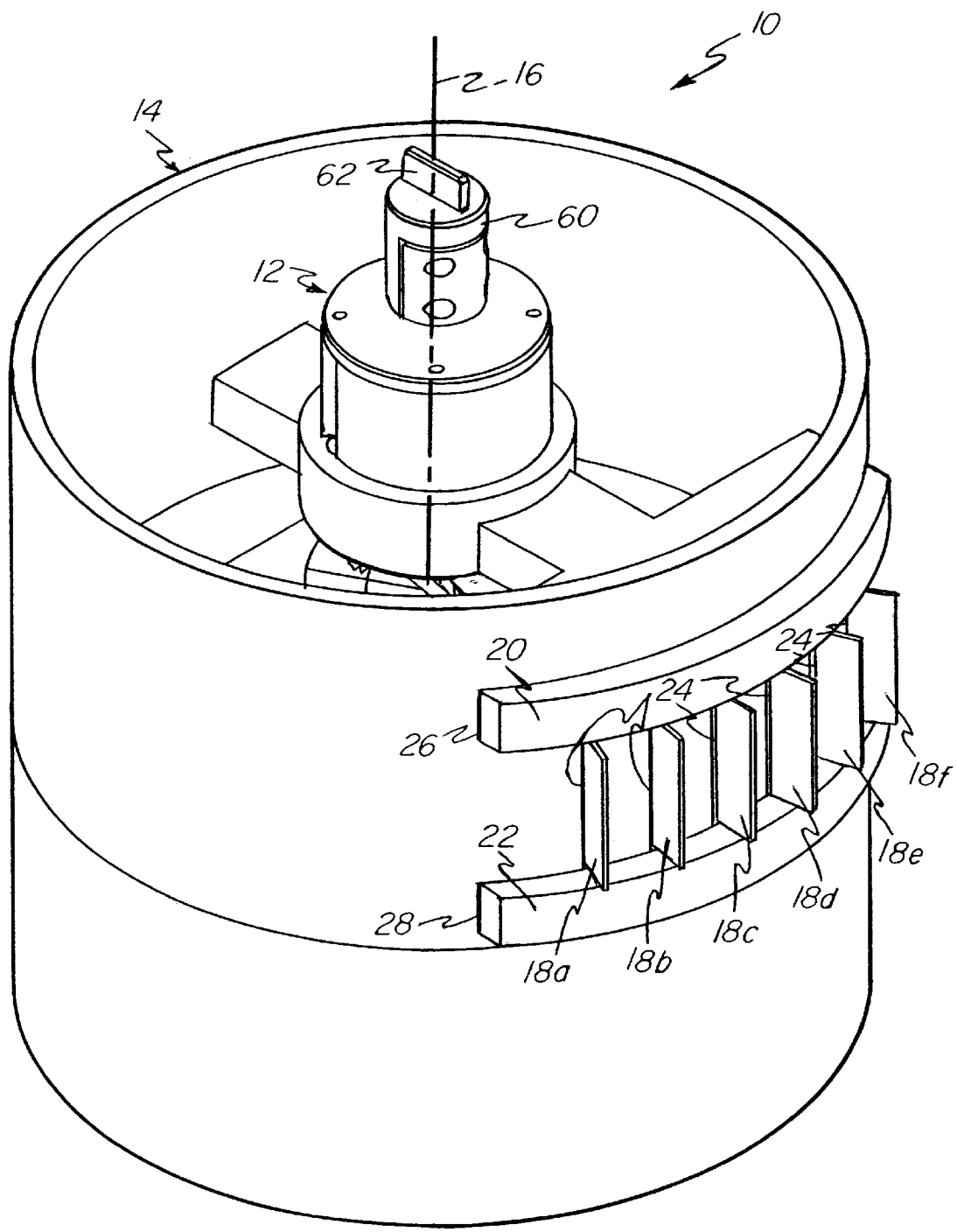
FIG. 2 is a perspective view of the winding tool with the forming members in an extended position.
Figure 3:
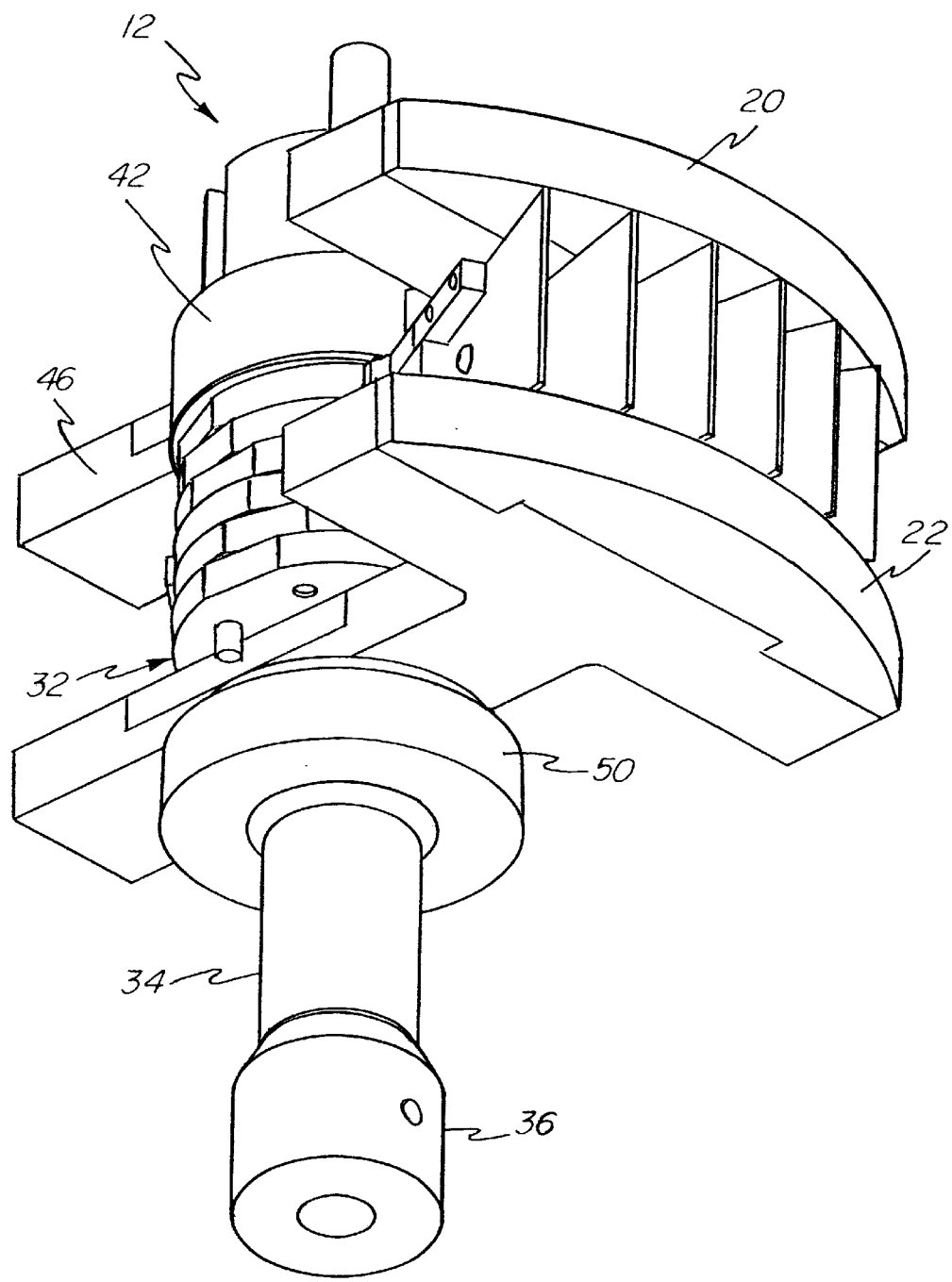
FIG. 3 is a bottom perspective view illustrating the forming member assembly.
Figure 4:
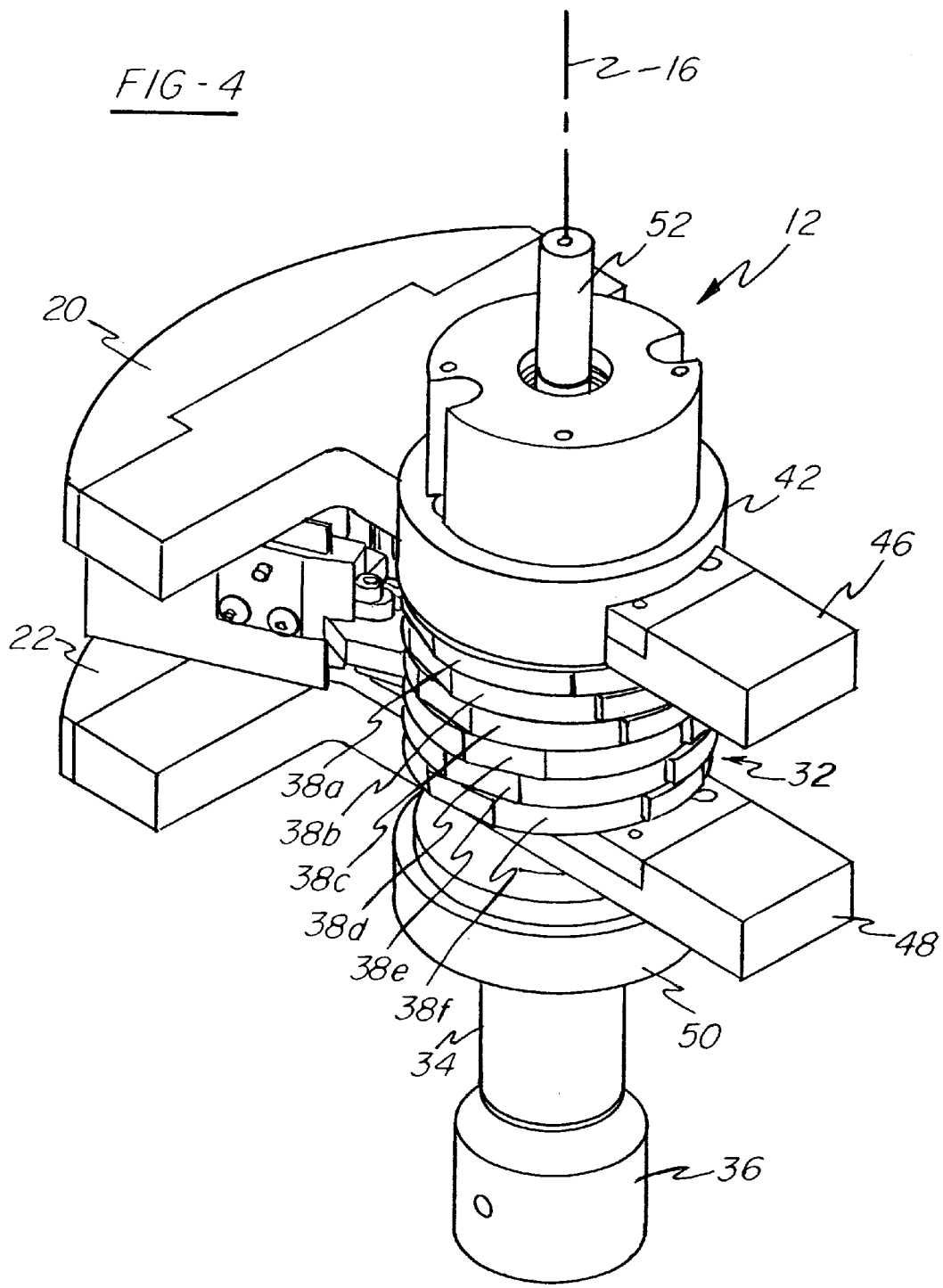
FIG. 4 is a top perspective view illustrating the forming member assembly.
Figure 5:
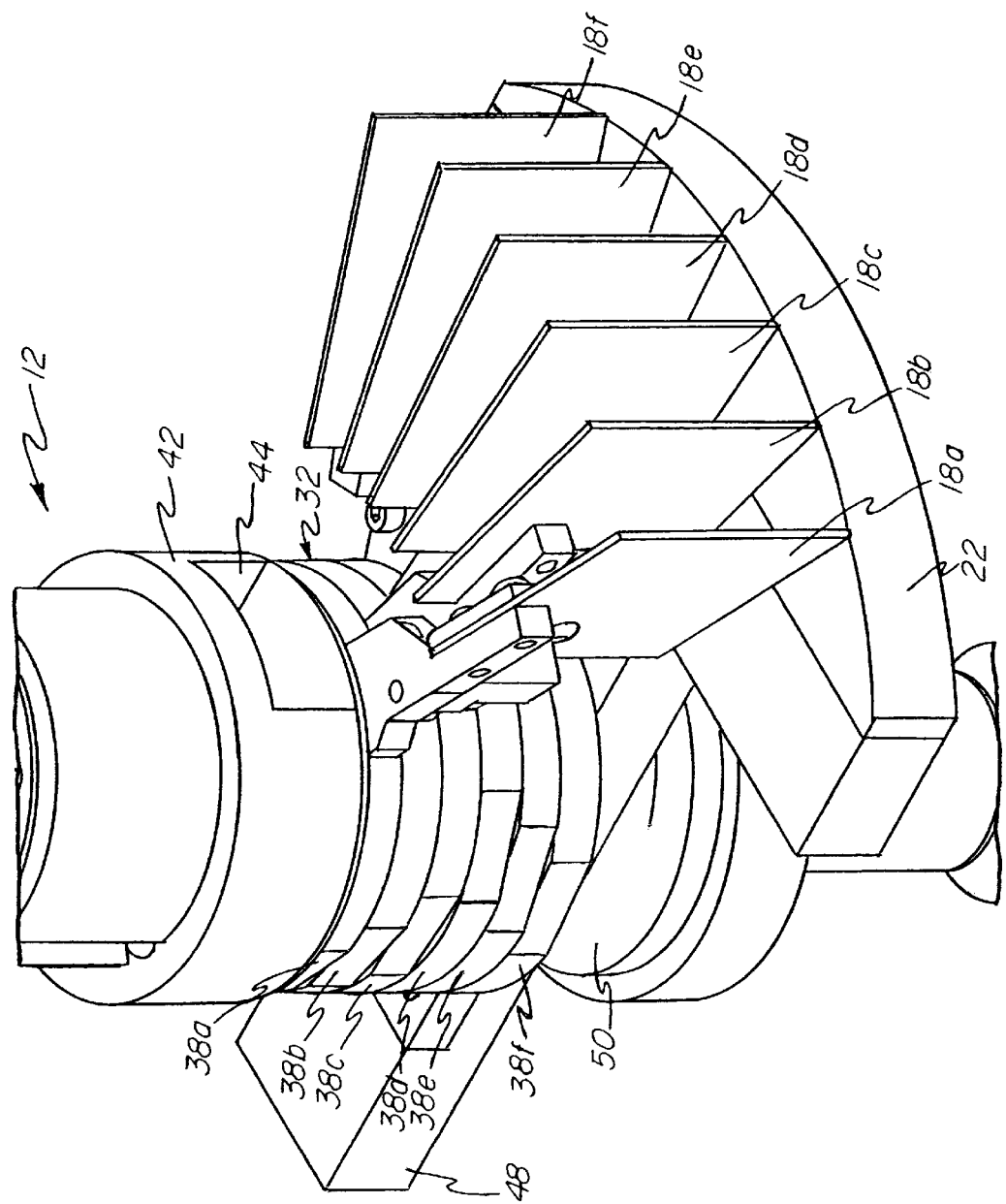
FIG. 5 is a top perspective view illustrating the forming member assembly with the top end former removed.
Figure 6:
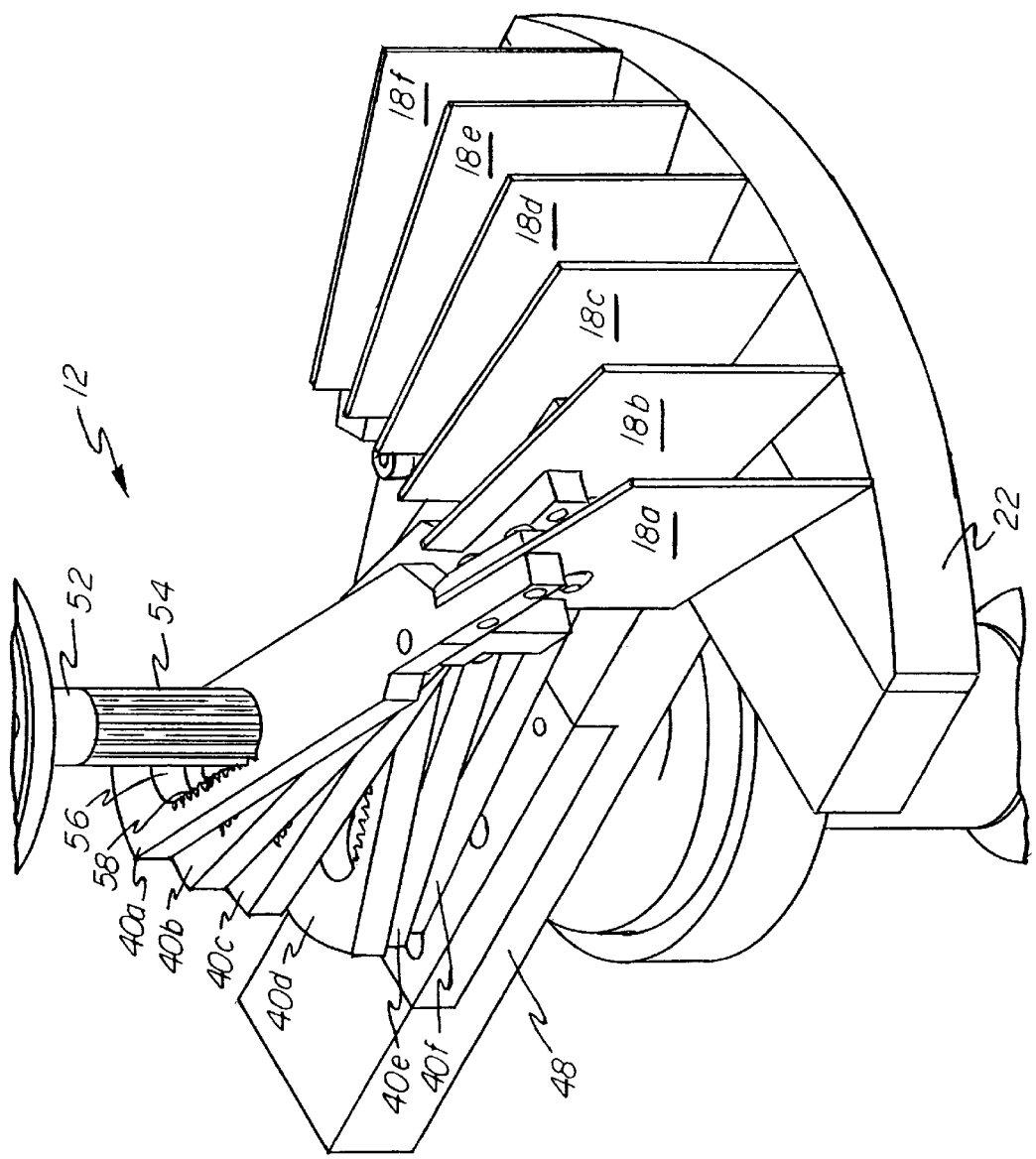
FIG. 6 is a top perspective view of the forming member assembly with the top end former and the forming member support structure removed to illustrate the pinion gear and forming rack structure for actuating the forming blades.

Referring to FIGS. 1 and 2, the winding tool 10 of the present invention is illustrated and comprises a base structure including a forming member assembly 12 and a cylindrical wall 14, and defining a central longitudinal axis 16. The forming member assembly 12 includes a plurality of forming blades 18a–f, and an upper end former 20 and lower end former 22 located at opposing ends of the forming blades 18a–f. The cylindrical wall 14 is provided with a plurality of slots 24 for receiving the forming blades 18a–f, and further includes upper and lower slots 26, 28 for receiving the end formers 20, 22 therethrough. In addition, the cylindrical wall 14 defines a plurality of wire apertures 30a–c located below the lower end former 22 for feeding a plurality of wires therethrough to a stator stack during a winding operation.

Referring to FIGS. 3–6, the forming member assembly 12 comprises the forming members, including the forming blades 18a–f and end formers 20, 22, and a forming member support structure 32 for guiding the forming members 18a–f, 20, 22 in radial movement relative to the cylindrical wall 14. The support structure includes a cylindrical assembly support 34, including a lower end 36 which is adapted to be mounted to the upper end of a winding machine spindle shaft provided in a winding machine of the type illustrated in U.S. Pat. No. 5,860,615, assigned to the assignee of the present invention, and incorporated herein by reference.

The assembly support 34 is located in stationary relationship to the cylindrical wall 14 and supports the forming member support structure 32, including a plurality of guide plates 38a–f for guiding the forming blades 18a–f for reciprocating radial movement. Specifically, each of the forming blades 18a–f is supported on a respective elongated plate-shaped blade slide 40a–f (FIG. 6), and each of the guide plates 38a–f (FIGS. 4 and 5) includes a slot for slidably receiving a respective blade slide 40a–f. In addition, an upper guide plate 42 is provided, including a slot 44 (FIG. 5) for receiving a slide portion 46 of the upper end former 20, and the slide portion 48 of the lower end former 22 is guided in sliding movement between the lower guide plate 38f and the upper surface of a lower bearing member 50.

Figure 7:
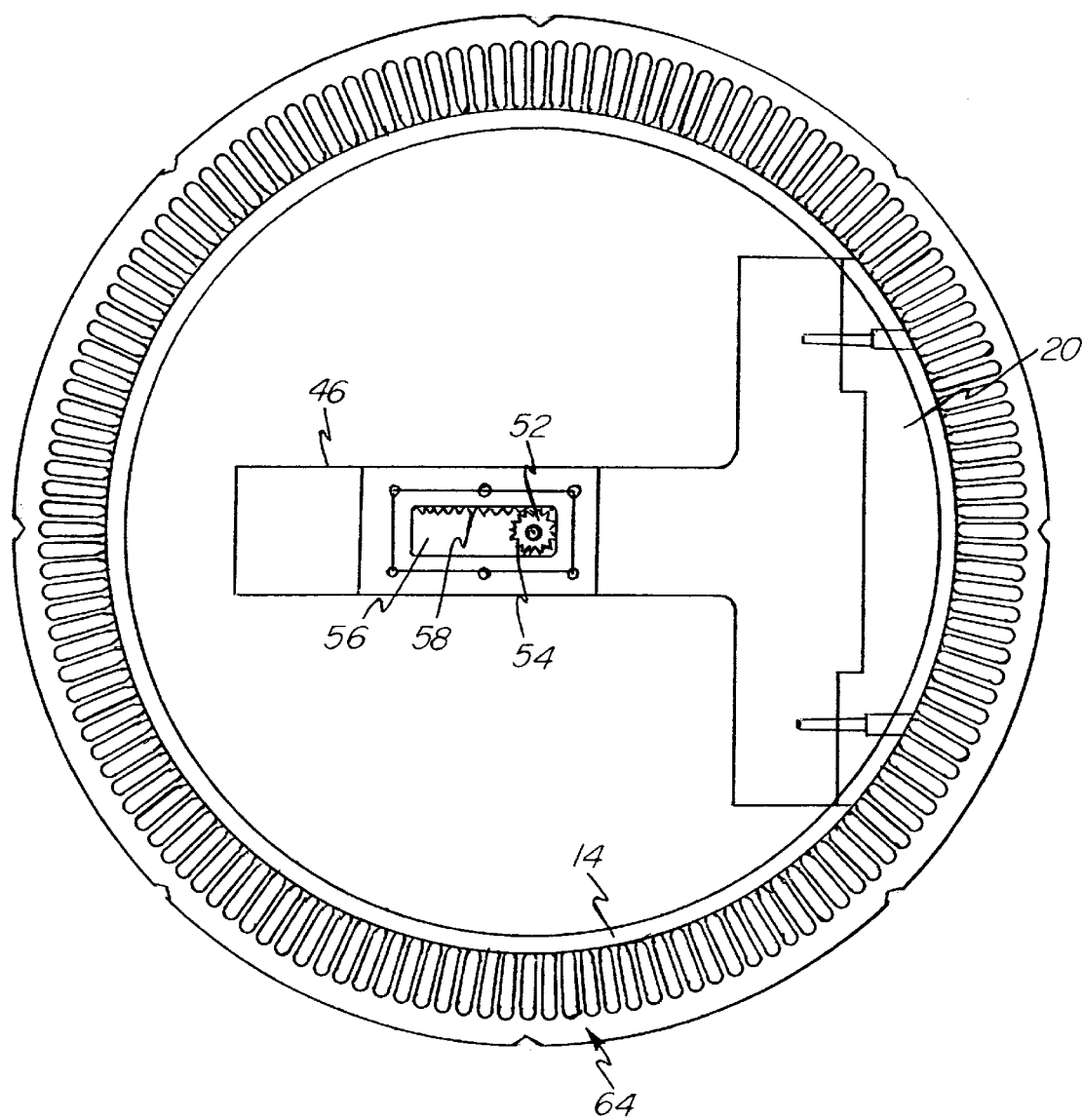
FIG. 7 is a top plan view illustrating the actuation structure for one of the end formers.

The support assembly 34 further supports an actuator structure for actuating the forming blades 18a–f and end formers 20, 22 in radial movement relative to the cylindrical wall 14. The actuator structure comprises an actuator shaft 52 (FIGS. 4 and 6) which is rotatable relative to the support structure 32 and includes a splined portion 54 defining gear teeth along a portion thereof passing through the blade slides 40a–f and 42, 48. Further, each of the blade slides 40a–f and 46, 48 include a slot portion 56 with teeth 58 formed along one side thereof to define a gear rack for engaging with the gear teeth defined on the spline portion 54 (see also FIG. 7). Accordingly, rotation of the actuator shaft 52 will cause the forming blades 18a–f and end formers 20, 22 to move simultaneously outwardly and inwardly relative to the cylindrical wall 14 of the winding tool 10.

The actuation of the actuator structure operates in substantially the same manner as is described for the actuation of forming members in U.S. Pat. No. 5,860,615. Further, it should be noted that the actuator shaft 52 is preferably provided with an upper key member 60 having a flange-like member 62 for engagement by an actuator mechanism of the type described in U.S. Pat. No. 5,860,615.

Figure 8:
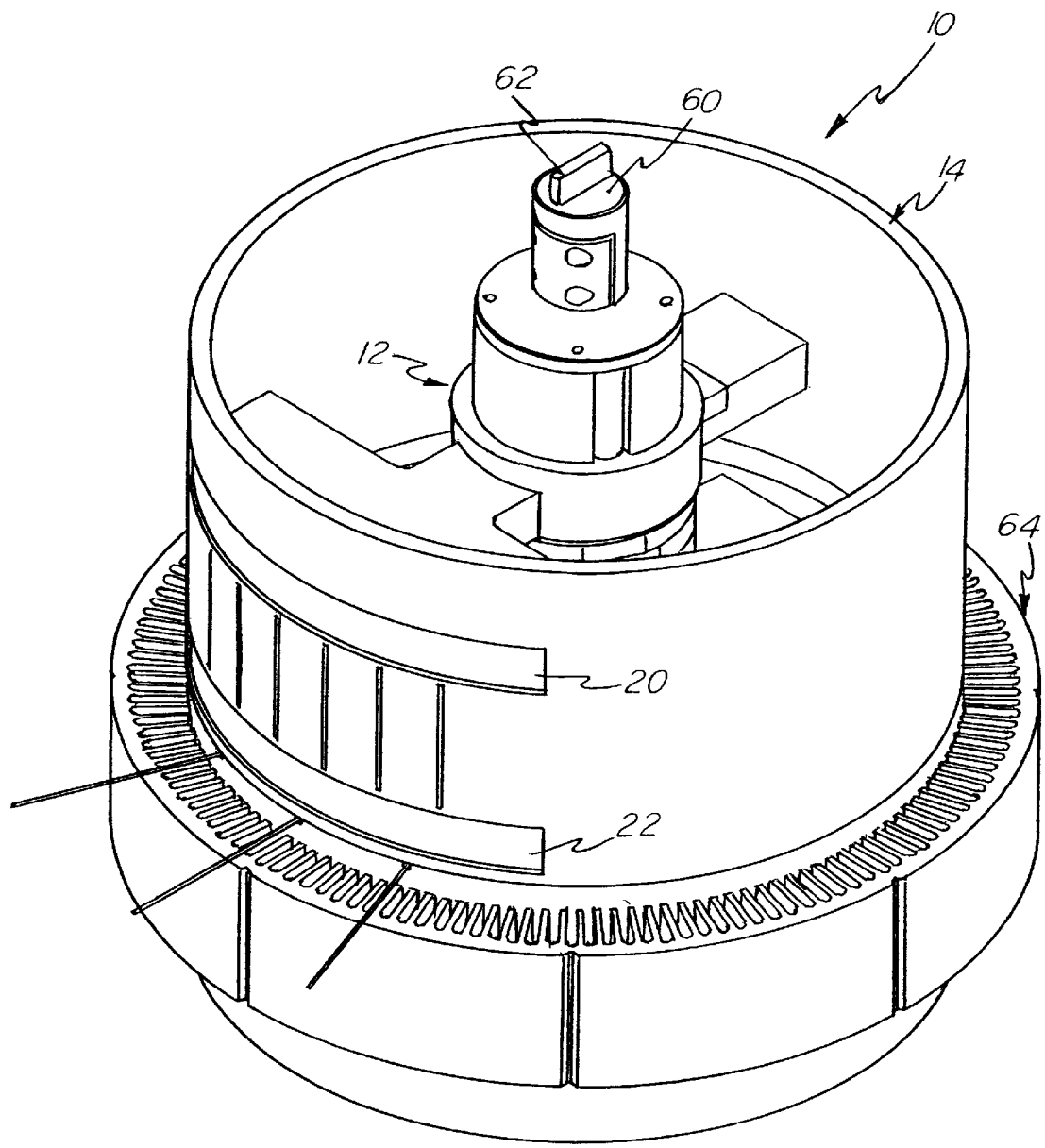
FIG. 8 is a perspective view illustrating the winding tool in a winding operation for forming wire coils on a stator stack.
Figure 9:
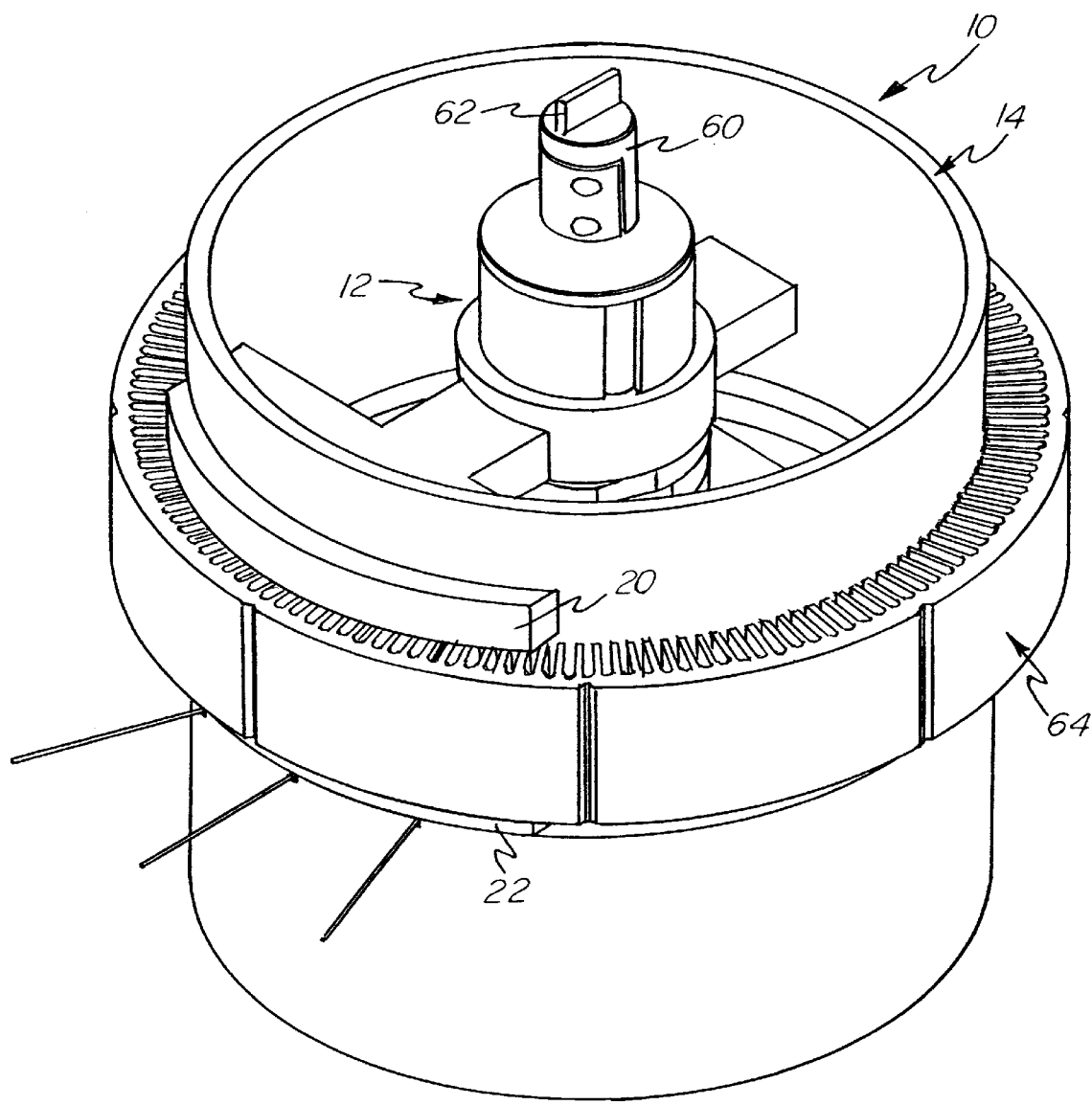
FIG. 9 is a perspective view illustrating a winding tool in a winding operation with the forming members in an extended position.

Referring to FIGS. 8–10, the operation of the winding tool 10 relative to a stator stack 64 is illustrated wherein the winding tool is moved in reciprocating and oscillating movement, feeding wire through the assembly support 34 and wire apertures 30a–c to form wire coils around the teeth of the stator stack 64. At various predetermined times in the winding operation, the winding tool will be positioned in the location illustrated in FIG. 9 in order to permit the forming members to push the wire in the slots outwardly and thereby produce greater slot fill efficiencies for providing increased wire to the slots.

In particular, it should be noted that the outer edges of the forming blades 18a–f are elongated in the vertical direction parallel to the longitudinal axis 16, and extend substantially the vertical length of the slots in the stator stack 64. In addition, it can be seen that the end formers 20, 22 extend transversely of the forming blades 18a–f and span a sector of the upper and lower surfaces of the stator stack 64. When actuated, the forming blades 18a–f will extend radially outwardly into a substantial portion of the slots defined in the stator stack 64, and the end formers 20, 22 will push both the upper and lower end turns of the coils radially outwardly simultaneously with the radial movement of the forming blades 18a–f. Thus, the end formers 20, 22 counteract any tendency of the end turns to flex radially inwardly as the wire located within the slots is pushed radially outwardly by the forming blades 18a–f. Further, it should be noted that the outer surfaces of the end formers 20, 22 are preferably formed of a synthetic material, such as Nylon or Teflon, to avoid damage to the insulation on the wire coils.

At completion of the forming operation by the forming blades 18a–f and end formers 20, 22, the forming members are retracted back toward the cylindrical wall 14 and are positioned flush with the outer surface of the cylindrical wall 14 whereby additional wire may be fed from the wire apertures 30a–c, without interference from the forming members as the winding tool is reciprocated through the stator stack 64.

Accordingly, it can be seen that the present invention provides an improved winding tool which facilitates positioning of the wire formed within stator slots during a winding operation, and which further ensures proper positioning of the wire both within the slots and forming the end turns between the slots.

It should further be apparent that although a particular number of forming blades have been illustrated in the present embodiment, a different number of forming blades may be provided within the scope of the present invention, and depending on the particular requirements of the stator being wound.

What is claimed is:

1. A winding tool for forming wire coils in a stator stack for a dynamoelectric machine, said winding tool comprising:

an elongated base structure defining a longitudinal axis;

at least one elongated forming blade supported on said base structure, said forming blade including an outer edge defining an axis of elongation lying in a plane substantially parallel to said longitudinal axis;

said forming blade being supported for movement, relative to said base structure, in a direction transverse to said longitudinal axis;

an actuator structure extending through said base structure for actuating said forming blade in movement in a radial direction relative to said longitudinal axis whereby said outer edge is moved from a retracted position to an extended position for insertion through a slot in a stator stack during a winding operation forming wire coils on the stator stack; and at least one end former located adjacent a longitudinal end of said forming blade and extending transversely of said forming blade for engaging end turns of wire coils on the stator stack.

2. The winding tool of claim 1 wherein said base structure defines a cylindrical wall and said outer edge of said forming blade is substantially flush with said cylindrical wall when said outer edge is in said retracted position.

3. The winding tool of claim 1 including at least one wire aperture defined on said base structure for guiding wire from within said base structure to the stator stack.

4. The winding tool of claim 1 wherein said end former is actuated for movement by said actuator structure simultaneously with actuation of said forming blade.

5. The winding tool of claim 1 comprising a plurality of said forming blades supported for movement in a radial direction from a retracted to an extended position.

6. The winding tool of claim 5 including a pair of end formers, said end formers located adjacent opposing ends of said forming blades and extending transversely of said forming blades for engaging end turns of wire coils on the stator stack.

7. The winding tool of claim 6 including at least one wire aperture defined on said base structure for guiding wire from within said base structure to the stator stack.

8. The winding tool of claim 7 wherein said base structure defines a cylindrical outer wall.

9. The winding tool of claim 8 wherein each of said forming blades include an outer edge which is substantially flush with said cylindrical outer wall when said forming blades are in said retracted position.

10. The winding tool of claim 8 wherein said end formers each include an outer surface which is substantially flush with said cylindrical outer wall when said end formers are in said retracted position.

11. A winding tool for forming wire coils in a stator stack for a dynamoelectric machine, said winding tool comprising:

an elongated base structure defining a longitudinal axis and comprising a cylindrical outer wall;

a plurality of circumferentially spaced slots defined in said outer wall;

a plurality of forming blades, each of said forming blades being slidably disposed through one of the circumferentially spaced slots and defining respective outer edges;

an actuator structure for extending and retracting the forming blades to move said outer edges from locations adjacent to said cylindrical outer surface to locations spaced from said cylindrical outer surface;

a wire aperture defined in said cylindrical outer surface for receiving and guiding wire outwardly from said base structure;

a wire guide structure extending through said base structure from one end thereof to said wire aperture for guiding wire internally of said base structure; and an end former located adjacent longitudinal ends of said forming blades, and extending transversely of said forming blades for engaging end turns of wire coils on the stator stacks.

12. The winding tool of claim 11 wherein said forming blades each include a rack extending radially toward said longitudinal axis, said racks being disposed in stacked relation to each other across said longitudinal axis.

13. The winding tool of claim 11 wherein said forming blades and said end formers each include a rack extending radially toward said longitudinal axis, said racks being disposed in stacked relation to each other across said longitudinal axis.

14. The winding tool of claim 13 wherein said racks each include a rack of gear teeth, and wherein the actuator structure comprises a shaft forming a pinion gear extending through the winding spindle and engaging the rack of gear teeth.

\* \* \* \* \*